US012794752B2

(12) United States Patent
Park et al.

(10) Patent No.: US 12,794,752 B2
(45) Date of Patent: Nov. 10, 2026

(54) WIRELESS COMMUNICATION DEVICE FOR CORRECTING NONLINEARITY OF TRANSMITTER AND OPERATING METHOD THEREOF

(71) Applicant: Samsung Electronics Co., Ltd., Suwon-si (KR)

(72) Inventors: Minjae Park, Suwon-si (KR); Hyunseok Yu, Suwon-si (KR); Youngik Cho, Suwon-si (KR); Joohyun Do, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 18/905,434

(22) Filed: Oct. 3, 2024

(65) Prior Publication Data

US 2025/0119337 A1 Apr. 10, 2025

(30) Foreign Application Priority Data

Oct. 10, 2023 (KR) ........................ 10-2023-0134362

(51) Int. Cl.
*H04L 27/36* (2006.01)
*H04B 17/11* (2015.01)
(Continued)

(52) U.S. Cl.
CPC ............ *H04L 27/364* (2013.01); *H04B 17/11* (2015.01); *H04B 17/21* (2015.01); *H04L 27/3863* (2013.01)

(58) Field of Classification Search
CPC ......... H04L 67/12; H04L 1/18; H04L 1/0041; H04L 1/0002; H04L 5/0064;
(Continued)

(56) References Cited

U.S. PATENT DOCUMENTS 9,223,028 B2 12/2015 Sullivan
10,333,764 B1 * 6/2019 Arditti Ilitzky ........ H03C 3/403
(Continued)

FOREIGN PATENT DOCUMENTS

CN 104753617 A 7/2015
CN 106355250 A 1/2017
EP 2538553 A1 12/2012

OTHER PUBLICATIONS

Extended European Search Report issued Feb. 26, 2025 in European Patent Application No. 24205186.0.
(Continued)

*Primary Examiner* — Eva Y Puente
(74) *Attorney, Agent, or Firm* — Fish & Richardson P.C.

(57) ABSTRACT

An operating method of a wireless communication device, the method including generating an IQ compensation value by performing IQ mismatch compensation on a first input signal using a linearity calibration model, the linearity calibration model being based on a neural network, generating a pre-distortion value by performing pre-distortion on the first input signal using the linearity calibration model, generating a first calibration signal based on the IQ compensation value and the pre-distortion value, generating a calibrated first output signal by amplifying the first calibration signal based on an amplification coefficient, and training the linearity calibration model based on the first input signal and the calibrated first output signal.

20 Claims, 10 Drawing Sheets

(51) Int. Cl.
*H04B 17/21* (2015.01)
*H04L 27/38* (2006.01)

(58) Field of Classification Search
CPC . H04L 67/1097; H04L 1/0009; H04L 1/1874; H04L 67/306; H04W 4/70; H04W 4/38; H04W 24/02; H04W 4/40; H04W 16/28; H04W 74/0833; H04W 4/80; H04W 4/35; H04W 16/02; H04B 1/0475; H04B 17/345; H04B 17/29; H04B 17/40; H04B 17/23; H04B 17/26; H04B 2001/0425; H04B 7/0617; H04B 1/04
See application file for complete search history.

(56) References Cited

U.S. PATENT DOCUMENTS

2013/0072139 A1* 3/2013 Kang .................. H04B 1/0028 455/114.3
2018/0167092 A1 6/2018 Hausmair et al.
2021/0203282 A1* 7/2021 Van Liere ............... H04L 25/08
2021/0203369 A1* 7/2021 Kasargod ............. H04B 1/0475
2021/0391832 A1* 12/2021 Barbu ...................... H04B 1/04
2022/0052885 A1* 2/2022 Luo .......................... G06N 3/09
2023/0021633 A1 1/2023 Li et al.
2023/0079385 A1 3/2023 Luo
2023/0138959 A1* 5/2023 Saikrishna ................ H03F 3/26 330/252

OTHER PUBLICATIONS

Fawzy et al, "Iterative Learning Control Based Digital Pre-Distortion for Mitigating Impairments in MIMO Wireless Transmitters", IEEE Transactions on Vehicular Technology, IEEE, USA, vol. 72, No. 6, Jan. 16, 2023 (Jan. 16, 2023), pp. 6933-6947, XP011943605.
Yibo Wu et al., "Low Complexity Joint Impairment Mitigation of I/Q Modulator and PA Using Neural Networks," IEEE Global Communications Conference, (GLOBECOM), Apr. 6, 2021, Taipei, Taiwan.
Masaaki Tanio et al., "Efficient Digital Predistortion Using Sparse Neural Network," IEEE Access, vol. 8, Jun. 2020, pp. 117841-117852.
Liu, Z. et al., "A Joint PAPR Reduction and Digital Predistortion Based on Real-Valued Neural Networks for OFDM Systems", IEEE Transactions on Broadcasting, vol. 68, No. 1, Mar. 2022, pp. 223-231.

* cited by examiner

WIRELESS COMMUNICATION DEVICE FOR CORRECTING NONLINEARITY OF TRANSMITTER AND OPERATING METHOD THEREOF

CROSS-REFERENCE TO RELATED APPLICATION

This application is based on and claims priority under 35 U.S.C. § 119 to Korean Patent Application No. 10-2023-0134362, filed on Oct. 10, 2023, in the Korean Intellectual Property Office, the disclosure of which is incorporated by reference herein in its entirety.

BACKGROUND

The inventive concepts relate to a wireless communication device, and more particularly, to a wireless communication device for correcting the nonlinearity of a transmitter and an operating method thereof.

Recently, along with the rapid development of wired and wireless communication technologies, and smart device related technologies, efforts to correct the nonlinearity of a transmitter of a wireless communication device in a wireless communication system have increased.

In general, a transmitter of a wireless communication device may include a power amplifier configured to generate a transmission signal by amplifying the strength of an input signal. Because power amplifiers have nonlinearity, a transmission signal with respect to an input signal of a certain level or higher nonlinearly increases. To correct the nonlinearity of a power amplifier, methods, such as crest factor reduction (CFR), pre-distortion, and IQ mismatch compensation, may be used. However, for example, because a heuristic method is used to select appropriate coefficients to be used for pre-distortion, it may be difficult to select the appropriate coefficients, thereby resulting in performance degradation. Therefore, a method of efficiently correcting the nonlinearity of a transmitter of a wireless communication device is demanded.

SUMMARY

The inventive concepts provide a wireless communication device having nonlinearity-corrected transmission performance by correcting the nonlinearity of a transmitter of the wireless communication device based on a neural network and an operating method thereof. According to embodiments, a method of efficiently correcting the nonlinearity of a transmitter of a wireless communication device is provided.

The technical challenges addressed by the inventive concepts are not limited to the technical challenges mentioned above, and the other non-mentioned technical challenges could be clearly understood by those of ordinary skill in the art from the description below.

According to an aspect of the inventive concepts, there is provided a wireless communication device including first processing circuitry configured to generate a calibration signal by performing linearity calibration on a first input signal using a linearity calibration model, the linearity calibration model being based on a first neural network, and a power amplifier configured to generate a calibrated output signal by amplifying the calibration signal based on an amplification coefficient, the linearity calibration model including a first output layer configured to generate a first IQ compensation value and a second IQ compensation value by performing IQ mismatch compensation on the first input signal, the first IQ compensation value corresponding to a real part of the calibrated output signal, and the second IQ compensation value corresponding to an imaginary part of the calibrated output signal, and second processing circuitry configured to generate a first pre-distortion value and a second pre-distortion value by performing pre-distortion on the first input signal, the first pre-distortion value corresponding to the real part of the calibrated output signal, and the second pre-distortion value corresponding to the imaginary part of the calibrated output signal, and the first processing circuitry is configured to generate the calibration signal based on the first IQ compensation value, the second IQ compensation value, the first pre-distortion value and the second pre-distortion value.

According to another aspect of the inventive concepts, there is provided an operating method of a wireless communication device, the method including generating an IQ compensation value by performing IQ mismatch compensation on a first input signal using a linearity calibration model, the linearity calibration model being based on a neural network, generating a pre-distortion value by performing pre-distortion on the first input signal using the linearity calibration model, generating a first calibration signal based on the IQ compensation value and the pre-distortion value, generating a calibrated first output signal by amplifying the first calibration signal based on an amplification coefficient, and training the linearity calibration model based on the first input signal and the calibrated first output signal.

According to another aspect of the inventive concepts, there is provided an operating method of a wireless communication device, the method including generating an IQ compensation value by performing IQ mismatch compensation on a first input signal using a linearity calibration model, the linearity calibration model being based on a first neural network, generating a pre-distortion value by performing pre-distortion on the first input signal using the linearity calibration model, generating a first calibration signal based on the IQ compensation value and the pre-distortion value, generating a calibrated first output signal by amplifying the first calibration signal based on an amplification coefficient, and training a power amplifier estimation model based on the first input signal and a first output signal to obtain a trained power amplifier estimation model, the power amplifier estimation model being based on a second neural network, and the first output signal being obtained by amplifying the first input signal based on the amplification coefficient.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Figure 1:
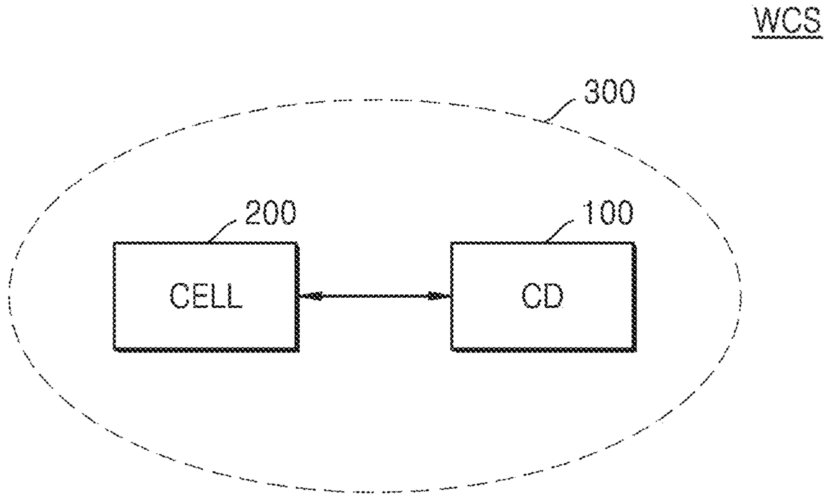
FIG. 1 is a block diagram illustrating a wireless communication system according to embodiments.

FIG. 1 is a block diagram illustrating a wireless communication system WCS according to embodiments.

Hereinafter, although embodiments are described with reference to the wireless communication system WCS being based on a new radio (NR) network, the technical idea of the inventive concepts is not limited to the NR network and may also be applied to other wireless communication systems (e.g., cellular communication systems, such as long term evolution (LTE), LTE-advanced (LTE-A), wireless broadband (WiBro), and global system for mobile communication (GSM), and/or short-range communication systems, such as Bluetooth and near field communication (NFC), having a similar technical background or channel configuration.

A wireless communication network of the wireless communication system WCS may support a plurality of wireless communication devices including a wireless communication device 100 to communicate with each other, by sharing available network resources. For example, in the wireless communication network, information may be provided by various multiple access schemes, such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

In addition, various functions described below may be implemented or supported by the artificial intelligence technology or one or more computer programs, and each of the computer programs includes computer-readable program code and is stored in a non-transitory computer-readable medium. The term "computer-readable medium" includes all types of computer-accessible media, such as read only memory (ROM), random access memory (RAM), a hard disk drive, a compact disc (CD), a digital video disc (DVD), and/or other types of memories. A non-transitory computer-readable medium excludes wired, wireless, optical, or other communication links configured to transmit transitory electrical or other signals. A non-transitory computer-readable medium includes a medium in which data may be permanently stored and a medium, such as a re-writable optical disc or an erasable memory device, in which data is stored and may be over-written later.

In embodiments described below, a hardware approach is illustrated. However, because embodiments include techniques using both hardware and software, embodiments do not exclude a software-based approach.

Referring to FIG. 1, the wireless communication system WCS may include a cell 200 and/or the wireless communication device 100. The cell 200 may generally indicate a fixed station which communicates with the wireless communication device 100 and/or another cell (not shown), and may exchange data and control information with the wireless communication device 100 and/or another cell (not shown) by communicating with the wireless communication device 100 and/or another cell (not shown). For example, the cell 200 may be referred to as a base station, a Node B, an evolved-Node B (eNB), a next generation Node B (gNB), a sector, a site, a base transceiver system (BTS), an access point (AP), a relay node, a remote radio head (RRH), a radio unit (RU), a small cell, a device, or the like.

User equipment (UE) as an example of the wireless communication device 100 may be fixed or be mobile and may be referred to as an arbitrary device capable of transmitting and receiving data and/or control information to/from the cell 200 by communicating with the cell 200. For example, the UE may be referred to as a terminal, terminal equipment, a mobile station (MS), a mobile terminal (MT), a user terminal (UT), a subscribe station (SS), a wireless communication device, a wireless device, a handheld device, or the like.

The cell 200 may provide wireless wideband access to the wireless communication device 100 in a coverage 300 of the cell 200. The wireless communication device 100 may communicate with the cell 200 by generating a transmission signal based on a baseband signal. The baseband signal indicates a signal having a relatively low frequency component before modulation. The wireless communication device 100 may generate a transmission signal by amplifying a baseband signal (e.g., a baseband signal modulated to a relatively high frequency) based on a power amplifier. The power amplifier may be a nonlinear element having a nonlinear output characteristic with respect to an input. In addition, the wireless communication device 100 may include not only the power amplifier but also at least one nonlinear element (e.g., at least one other nonlinear element). If nonlinearity occurs between a baseband signal and a transmission signal due to the nonlinearity of the wireless communication device 100, the quality of the transmission signal may be degraded. For example, the wireless communication device 100 may not transmit a transmission signal having a desired strength due to the nonlinearity of the wireless communication device 100, and noise may be in the transmission signal because an unnecessary (or extraneous) frequency component is generated due to an intermodulation effect. Therefore, a method of correcting the nonlinearity of the wireless communication device 100 is demanded.

The wireless communication device 100 according to the inventive concepts may correct the nonlinearity of the wireless communication device 100 using linearity calibration model based on a neural network. The wireless communication device 100 according to the inventive concepts may generate a calibration signal by performing pre-distortion, IQ mismatch compensation, and crest factor reduction (CFR) on a baseband signal based on the one linearity calibration model. The wireless communication device 100 may generate an output signal (or referred to as a transmission signal) based on the calibration signal, thereby correcting nonlinearity between a baseband signal and the output signal due to nonlinearity elements included in the wireless communication device 100.

Figure 2:
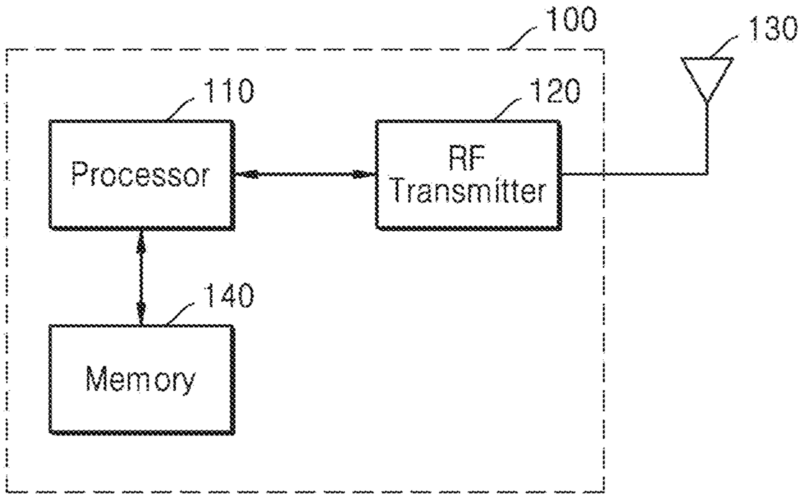
FIG. 2 is a block diagram illustrating a wireless communication device according to embodiments.

FIG. 2 is a block diagram illustrating the wireless communication device 100 according to embodiments.

The wireless communication device 100 of FIG. 2 indicates the wireless communication device 100 described with reference to FIG. 1. Therefore, the description made with reference to FIG. 1 is not repeated herein.

Referring to FIG. 2, the wireless communication device 100 according to the inventive concepts may include a processor 110, a transmitter 120, an antenna 130, and/or a memory 140. The wireless communication device 100 may further include various components in addition to the components shown in FIG. 2.

The wireless communication device 100 may access a wireless communication system by transmitting and receiving signals to and from the wireless communication system through the antenna 130.

The processor 110 may control a general operation of the wireless communication device 100, and for example, the processor 110 may be a central processing unit (CPU). The processor 110 may include one processor core (single core) or a plurality of processor cores (multi-core). The processor 110 may process or execute programs and/or data stored in the memory 140. In embodiments, the processor 110 may control various functions of the wireless communication device 100 or perform various computations, by executing the programs stored in the memory 140.

The processor 110 according to the inventive concepts may generate a calibration signal by performing pre-distortion and IQ mismatch compensation on an input signal based on a linearity calibration model. The linearity calibration model may perform pre-distortion and IQ mismatch compensation on an input signal based on a neural network. Particularly, the linearity calibration model may include two output layers and generate the calibration signal based on outputs of the two output layers. Herein, the input signal may include the baseband signal described with reference to FIG. 1 or a signal obtained by up-converting the baseband signal from a baseband to a transmission band (a radio frequency). A detailed description of a structure of the neural network is made below with reference to FIG. 3, and a detailed description of the structure and operation of the processor 110, pre-distortion, and IQ mismatch compensation is made below with reference to FIGS. 4 and 5.

The transmitter 120 may be connected to the processor 110. The transmitter 120 may receive the calibration signal from the processor 110. The transmitter 120 may generate an output signal by amplifying the calibration signal. The transmitter 120 may include a power amplifier to be described below and amplify the calibration signal based on the power amplifier. In this case, the power amplifier may have nonlinearity, and thus, as described above, if linearity calibration (e.g., pre-distortion and IQ mismatch compensation) on the input signal is performed based on the processor 110, the nonlinearity of the output signal with respect to the input signal may be corrected. A more detailed structure and operation of the transmitter 120 is described below with reference to FIG. 4. According to embodiments, the transmitter 120 may be a transceiver.

The antenna 130 may be connected to the transmitter 120. The antenna 130 may receive the output signal from the transmitter 120. The antenna 130 may transmit the received output signal to another wireless communication device and/or the cell 200 (see FIG. 1). In addition, the antenna 130 may receive a signal from another wireless communication device. Some components used to receive a signal from another wireless communication device through the antenna 130 are not shown in FIG. 2. In embodiments, the wireless communication device 100 may include a plurality of antennas for phased array, multiple-input and multiple-output (MIMO), or the like.

The memory 140 according to the inventive concepts may store at least one input signal generated before a current input signal and transmit the at least one stored input signal to the processor 110. For example, the memory 140 may store the magnitude of each of the at least one stored input signal (e.g., the amplitude of an input signal) and output the stored magnitude to the processor 110. The memory 140 may receive the current input signal from the processor 110 and store the received current input signal. For example, the memory 140 may store the magnitude of the current input signal.

The linearity calibration model according to the inventive concepts may generate a calibration signal for the current input signal based on the current input signal and the at least one input signal previously generated. For example, the processor 110 may receive the magnitude of each of the current input signal and the at least one input signal previously generated and generate the calibration signal for the current input signal based on the linearity calibration model.

Figure 3:
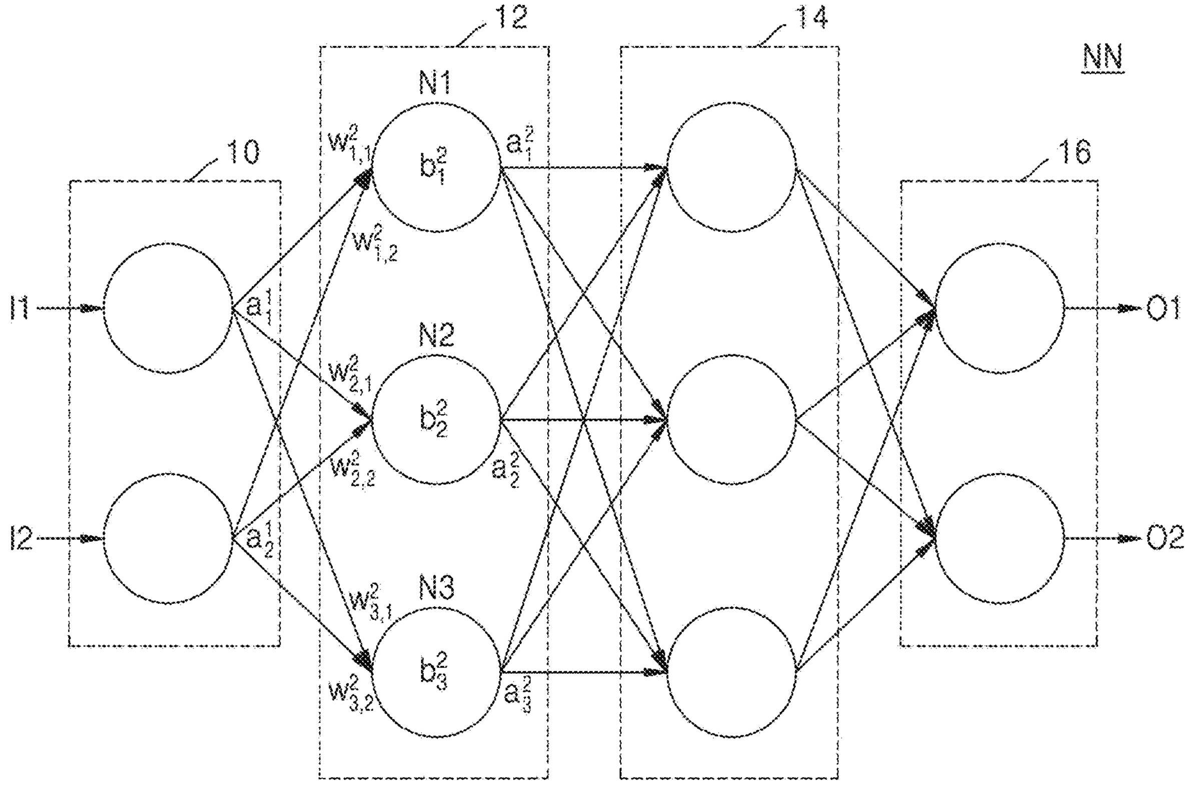
FIG. 3 is a block diagram illustrating a neural network applied to a linearity calibration model, according to embodiments.

FIG. 3 is a block diagram illustrating a neural network NN applied to a linearity calibration model, according to embodiments.

The linearity calibration model according to the inventive concepts is based on a neural network. The neural network NN of FIG. 3 is to help understanding of a neural network structure of the linearity calibration model according to the inventive concepts, and the inventive concepts are not limited thereto.

Referring to FIG. 3, the neural network NN may have a structure including an input layer, hidden layers, and an output layer. The neural network NN may perform computations based on received input data (e.g., I1 and I2) and generate output data (e.g., O1 and O2) based on a performing result. Herein, the input data I1 and I2 may correspond to the input signal described with reference to FIG. 2. For example, an input signal for wireless communication may be represented by a complex number. The input signal represented by a complex number may be referred to as a complex signal. The input data I1 may be the real part of the complex signal, and the input data I2 may be the imaginary part of the complex signal. Herein, the real part and the imaginary part of the complex signal may be referred to as an in-phase and a quadrature phase, respectively, and as an IQ signal based on the acronym of the in-phase and the quadrature phase. Each of the input signal, the calibration signal, and the output signal according to the inventive concepts may be an IQ signal.

The neural network NN may be a deep neural network (DNN) or n-layer neural network including two or more hidden layers. For example, the neural network NN may be a DNN including a plurality of layers, e.g., an input layer 10, first and second hidden layers 12 and 14, and an output layer 16. However, the present disclosure is not limited thereto. The plurality of layers 10, 12, 14, and 16 may be implemented by a convolutional layer, a fully-connected layer, a softmax layer, and the like. For example, the convolutional layer may include convolution, pooling, activation function computations, and the like. Alternatively, each of convolution, pooling, activation function computations may constitute a layer. However, as described above, the linearity calibration model according to the inventive concepts is not limited thereto.

Each of outputs of the plurality of layers 10, 12, 14, and 16 may be referred to as a feature (or a feature map). The plurality of layers 10, 12, 14, and 16 may receive, as an input feature, a feature generated in a previous layer and generate an output feature or an output signal by computing the input feature. A feature indicates data in which various features of input data recognizable by the neural network NN are represented.

When the neural network NN has a DNN structure, the neural network NN may include relatively many layers from which effective information is extracted, and thus, the neural network NN may process complicated data sets. Although FIG. 3 shows that the neural network NN includes four layers (the plurality of layers 10, 12, 14, and 16), this is only illustrative, and the neural network NN may include less or more layers. In addition, the neural network NN may include various layers having different structures from the structure shown in FIG. 3.

Each of the plurality of layers 10, 12, 14, and 16 included in the neural network NN may include a plurality of neurons. A neuron may correspond an artificial node known as a processing element (PE), a unit, or a similar term. For example, as shown in FIG. 3, the input layer 10 may include two neurons (nodes), and each of the first and second hidden layers 12 and 14 may include three neurons (nodes). However, this is only illustrative, and the layers included in the neural network NN may include variable numbers of neurons (nodes), respectively.

The neurons included in two adjacent layers of the plurality of layers 10, 12, 14, and 16 included in the neural network NN may be connected one to the others between the two adjacent layers to exchange data. One neuron may receive data from other neurons, compute the received data, and output a computation result to other neurons.

An input and an output of each of neurons (nodes) (e.g., N1, N2, and N3) may be referred to as an input activation and an output activation, respectively. That is, an activation may be an output of one neuron and simultaneously (or contemporaneously) a parameter corresponding to an input of the neurons included in a subsequent layer. The neurons may determine respective output activations based on output activations $$\left(\text{e.g., } a_1^1,\ a_2^1,\ a_1^2,\ a_2^2,\text{ and } a_3^2\right)$$

received from the neurons included in a previous layer, weights $$\left(\text{e.g., } w_{1,1}^2,\ w_{1,2}^2,\ w_{2,2}^2,\ w_{3,1}^2,\text{ and } w_{3,2}^2\right),$$

and biases $$\left(\text{e.g., } b_1^2,\ b_2^2,\text{ and } b_3^2\right).$$

A weight and a bias are parameters (may be referred to as computation parameters) used to calculate an output activation in each neuron, wherein the weight is a value allocated to a connection relationship between neurons, and the bias indicates a weight related to an individual neuron. As described with reference to FIG. 1, the neural network NN may determine parameters, such as weights and biases, through training, e.g., machine learning, based on training data.

The linearity calibration model according to the inventive concepts may update weights and biases based on an input signal and an output signal. Hereinafter, update of weights and/or biases (e.g., update of parameters) may be referred to as training the linearity calibration model.

The linearity calibration model according to the inventive concepts may include two input layers, two output layers, and a phase filter. A detailed description of the linearity calibration model is described below with reference to FIG. 6.

Figure 4:
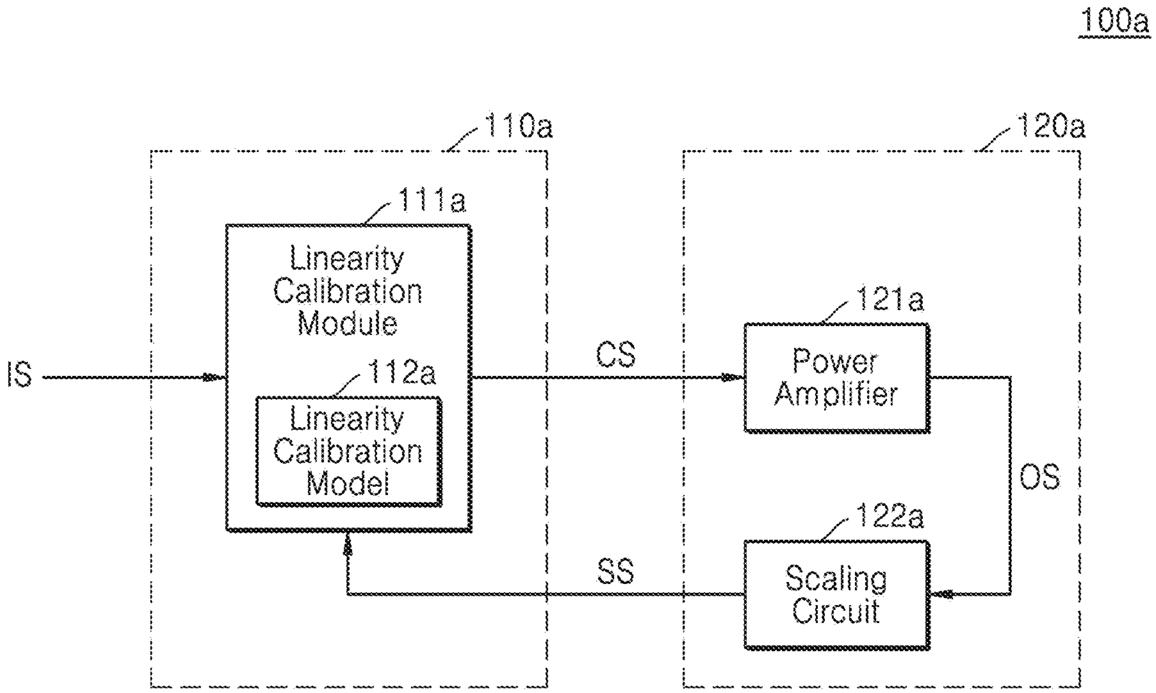
FIG. 4 is a block diagram illustrating a wireless communication device according to embodiments.

FIG. 4 is a block diagram illustrating a wireless communication device 100*a* according to embodiments.

The wireless communication device 100*a*, a processor 110*a*, and a transmitter 120*a* of FIG. 4 may correspond to the wireless communication device 100, the processor 110, and the transmitter 120 described with reference to FIG. 2, respectively. Therefore, the description made with reference to FIG. 2 is not repeated herein.

The wireless communication device 100*a* of FIG. 4 may include the processor 110*a* and/or the transmitter 120*a*. The processor 110*a* may include a linearity calibration module 111*a*, and the transmitter 120*a* may include a power amplifier 121*a* and/or a scaling circuit 122*a*.

The linearity calibration module 111*a* may include processing circuitry, such as hardware including a logic circuit, a combination of hardware/software, such as a processor for executing software, or a combination thereof. For example, more particularly, the processing circuitry may include a CPU, an arithmetic logic unit (ALU), a digital signal processor, a microcomputer, a field programmable gate array (FPGA), a microprocessor, an application-specific integrated circuit (ASIC), or the like, but the inventive concepts are not limited thereto.

The linearity calibration module 111*a* may generate a calibration signal CS by performing linearity calibration on an input signal IS based on a linearity calibration model 112*a* based on a neural network. Herein, the linearity calibration may include CFR, pre-distortion, IQ mismatch compensation, and the like. In the inventive concepts, the linearity calibration may indicate processing for correcting the nonlinearity of an output signal with respect to an input signal, the nonlinearity being caused by a nonlinear element included in the wireless communication device 100*a*. In particular, the linearity calibration may indicate processing for correcting the nonlinearity of the power amplifier 121*a*.

The CFR described above may indicate a method of correcting nonlinearity due to the peak to average power ratio (PAPR) of an input signal. Because the power amplifier 121*a* has nonlinearity increasing with respect to relatively high power, the nonlinearity of the power amplifier 121*a* may be corrected by removing a component having relatively high power from among components included in an input signal.

The pre-distortion described above is a characteristic opposite to the nonlinearity of the power amplifier 121*a* and may indicate a scheme of distorting the input signal IS in advance. For example, when the nonlinearity of the power amplifier 121*a* has a logarithmic function form, the nonlinearity of the power amplifier 121*a* may be corrected by pre-distorting an input signal to an exponential function form corresponding to the inverse function of a logarithmic function. However, the example described above is only illustrative, and the pre-distortion according to the inventive concepts is not limited thereto.

The IQ mismatch compensation described above may indicate compensation for IQ mismatch. The IQ mismatch may include gain mismatch and phase mismatch. The wireless communication device 100*a* according to the inventive concepts may further include a local oscillator (not shown). The local oscillator may be included in the transmitter 120*a*, but the inventive concepts are not limited thereto. The local oscillator may modulate a baseband signal into a carrier frequency signal by up-converting the baseband signal or modulate a carrier frequency signal into a baseband signal by down-converting the carrier frequency signal. As described above, because a baseband signal includes a real part and an imaginary part, the baseband signal may be referred to as an IQ signal, and when both the real part and the imaginary part that are orthogonal to each other are modulated based on the local oscillator, mutual interference may occur due to an error of the local oscillator, thereby causing communication performance to be degraded. Particularly, the gain mismatch may indicate a case where there is a magnitude difference between the real part and the imaginary part of a signal obtained by modulating a baseband signal through the local oscillator, the phase mismatch may indicate a case where the real part is not orthogonal to the imaginary part, and due to the gain mismatch and the phase mismatch, the error vector magnitude (EVM) of a transmission signal may increase, thereby causing communication performance to be degraded. Therefore, IQ mismatch compensation may be used for transmission performance improvement.

The linearity calibration module 111*a* according to the inventive concepts may generate the calibration signal CS by performing CFR, pre-distortion, and/or IQ mismatch compensation on the input signal IS using a linearity calibration model 112*a* based on a neural network. The linearity calibration module 111*a* may transmit the calibration signal CS to the transmitter 120*a*. A detailed description of each of CFR, pre-distortion, and IQ mismatch compensation based on the linearity calibration model 112*a* according to the inventive concepts is described below with reference to FIG. 6.

The transmitter 120*a* according to the inventive concepts may receive the calibration signal CS. The transmitter 120*a* may generate an output signal OS by amplifying the calibration signal CS based on the amplification coefficient of the power amplifier 121*a*. Herein, the output signal OS may include an output signal generated by amplifying the input signal IS and an output signal generated by amplifying the calibration signal CS. That is, the output signal OS may indicate the output signal generated by amplifying the input signal IS or the output signal generated by amplifying the calibration signal CS, according to a description. To be discriminated from the output signal generated by amplifying the input signal IS, the output signal generated by amplifying the calibration signal CS may be referred to as a calibrated output signal. In this case, the power amplifier 121*a* has nonlinearity as described above, and the calibration signal CS is a signal on which linearity calibration including CFR, pre-distortion, and IQ mismatch compensation has been performed, and thus, the output signal OS generated by amplifying the calibration signal CS may be a signal obtained by correcting the nonlinearity of the power amplifier 121*a* (as such the output signal OS may be referred to as a calibrated output signal). The calibrated output signal may indicate the transmission signal described above. Therefore, the calibrated output signal may be transmitted through the antenna 130 (see FIG. 2) as described above with reference to FIG. 2. According to embodiments, the wireless communication device 100*a* may transmit the calibrated output signal to the cell 200 and/or to another wireless communication device 100*a*. According to embodiments, the wireless communication device 100*a* may receive a reply signal (e.g., from the cell 200 and/or the other wireless communication device 100*a*) in response to the transmitted calibrated output signal. The wireless communication device 100*a* may process the reply signal (e.g., downconvert, demodulate, etc.) to obtain a message contained in the reply signal.

The power amplifier 121*a* may transmit the output signal OS to the scaling circuit 122*a*. The scaling circuit 122*a* may output a scaled output signal SS (or a down-scaled output signal) by scaling the output signal OS by the reciprocal of the amplification coefficient of the power amplifier 121*a*. The scaled output signal SS may have the same magnitude as (or a similar magnitude to) the input signal IS. For example, the scaling circuit 122*a* may generate the scaled output signal SS by scaling at least one of the output signal based on the input signal IS and/or the output signal based on the calibration signal CS according to embodiments described below.

The wireless communication device 100*a* according to the inventive concepts may further include the local oscillator as described above, and the local oscillator may downconvert the scaled output signal SS. The band of the scaled output signal SS, which has been down-converted, may be the same as (or similar to) the band of the input signal IS. Hereinafter, it is described that the wireless communication device 100*a* trains the linearity calibration model 112*a* based on the input signal IS and the output signal OS (the calibrated output signal). Herein, for convenience of description, it is premised that the output signal OS indicates the scaled output signal SS and that the band of the input signal IS is the same as (or similar to) the band of the output signal OS. However, this is for convenience of description, and the inventive concepts are not limited thereto.

The linearity calibration module 111*a* may train the linearity calibration model 112*a* based on the input signal IS and the scaled output signal SS.

The wireless communication device 100*a* according to the inventive concepts may correct the nonlinearity of the wireless communication device 100*a* by performing linearity calibration on an input signal (e.g., an input signal generated after the input signal IS described above) based on the linearity calibration model 112*a* that has been trained. That is, the wireless communication device 100*a* may train the linearity calibration model 112*a* based on the input signal IS and the output signal OS generated by the power amplifier 121*a*, and as described above, the training may be repeated based on a plurality of input signals to improve the nonlinearity correction performance of the wireless communication device 100*a* using the linearity calibration model 112*a*.

Figure 5:
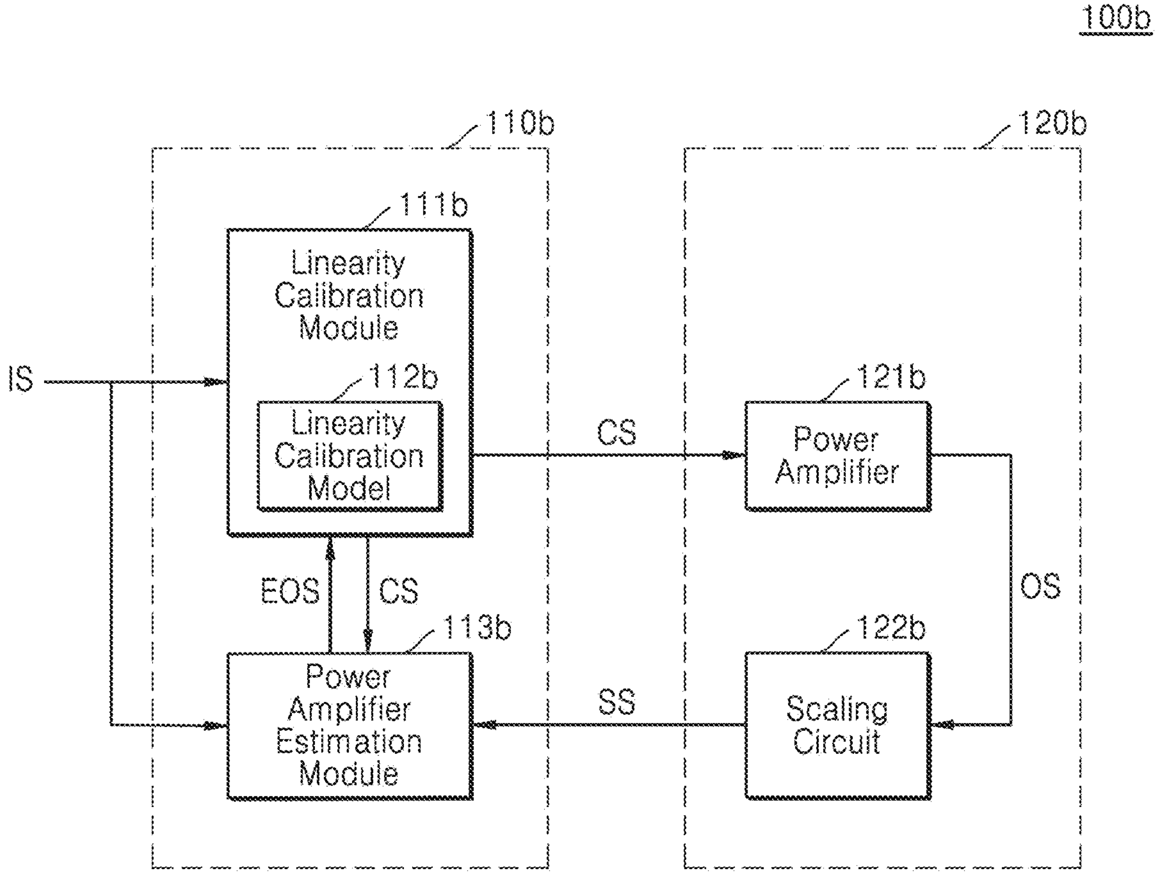
FIG. 5 is a block diagram illustrating a wireless communication device according to embodiments.

FIG. 5 is a block diagram illustrating a wireless communication device 100*b* according to embodiments.

The wireless communication device 100*b* of FIG. 5 may include a processor 110*b* and/or a transmitter 120*b*. The processor 110*b* may include a linearity calibration module 111*b* and/or a power amplifier estimation module 113*b*, and the transmitter 120*b* may include a power amplifier 121*b* and/or a scaling circuit 122*b*.

Because the wireless communication device 100*b*, the processor 110*b*, the transmitter 120*b*, the linearity calibration module 111*b*, the power amplifier 121*b*, and the scaling circuit 122*b* of FIG. 5 respectively correspond to the wireless communication device 100*a*, the processor 110*a*, the transmitter 120*a*, the linearity calibration module 111*a*, the power amplifier 121*a*, and the scaling circuit 122*a* of FIG. 4, a duplicated description is omitted herein.

Referring to FIGS. 4 and 5, the wireless communication device 100*b* of FIG. 5 may further include the power amplifier estimation module 113*b*.

The power amplifier estimation module 113*b* according to the inventive concepts may generate an estimated output signal EOS based on a power amplifier estimation model and the calibration signal CS. The power amplifier estimation model may be based on a neural network (see FIG. 3). However, the inventive concepts are not limited thereto, and the power amplifier estimation model may be based on either a memory polynomial (MP) or a generalized MP (GMP). The power amplifier estimation module 113*b* according to the inventive concepts may train the power amplifier estimation model based on the input signal IS and the output signal OS. Herein, the output signal OS may be a signal obtained by amplifying the input signal IS based on an amplification coefficient. However, the inventive concepts are not limited thereto. The linearity calibration module 111*b* according to the inventive concepts may train a linearity calibration model 112*b* based on the estimated output signal EOS and the input signal IS.

The power amplifier estimation module 113*b* according to the inventive concepts may generate the estimated output signal EOS based on the trained power amplifier estimation model and the calibration signal CS. The estimated output signal EOS may be similar to or the same as the output signal OS (e.g., the calibrated output signal) generated by the power amplifier 121*b* based on the calibration signal CS. As described above, the power amplifier estimation module 113*b* may train the power amplifier estimation model (e.g., update parameters for the power amplifier estimation model, such as weights and biases) based on the input signal IS and an output signal obtained by amplifying the input signal IS based on the amplification coefficient, and the power amplifier estimation model may be repetitively trained by repeating this operation on each of a plurality of input signals. The fully trained power amplifier estimation model may operate similarly to or the same as the power amplifier 121*b*.

Therefore, the wireless communication device 100*b* according to the inventive concepts may train the linearity calibration model 112*b* based on the input signal IS and the estimated output signal EOS generated based on the trained power amplifier estimation model, even when the output signal OS through the power amplifier 121*b* is not generated. The wireless communication device 100*b* may generate the output signal OS calibrated based on the linearity calibration model 112*b* that has been trained, and the output signal OS which has been calibrated may be a signal of which non-linearity by the wireless communication device 100*b* has been corrected. According to embodiments, the wireless communication device 100*b* may transmit the output signal OS to the cell 200 and/or to another wireless communication device 100*b*. According to embodiments, the wireless communication device 100*b* may receive a reply signal (e.g., from the cell 200 and/or the other wireless communication device 100*b*) in response to the transmitted output signal OS. The wireless communication device 100*b* may process the reply signal (e.g., downconvert, demodulate, etc.) to obtain a message contained in the reply signal FIG. 6 is a block diagram illustrating a linearity calibration model 112*c* according to embodiments.

The structure (e.g., a hidden layer HL, a first output layer OL_1, a second output layer OL_2, and the nodes in each layer) of the linearity calibration model 112*c* shown in FIG. 6 may be easily understood through the neural network NN described with reference to FIG. 3.

Figure 6:
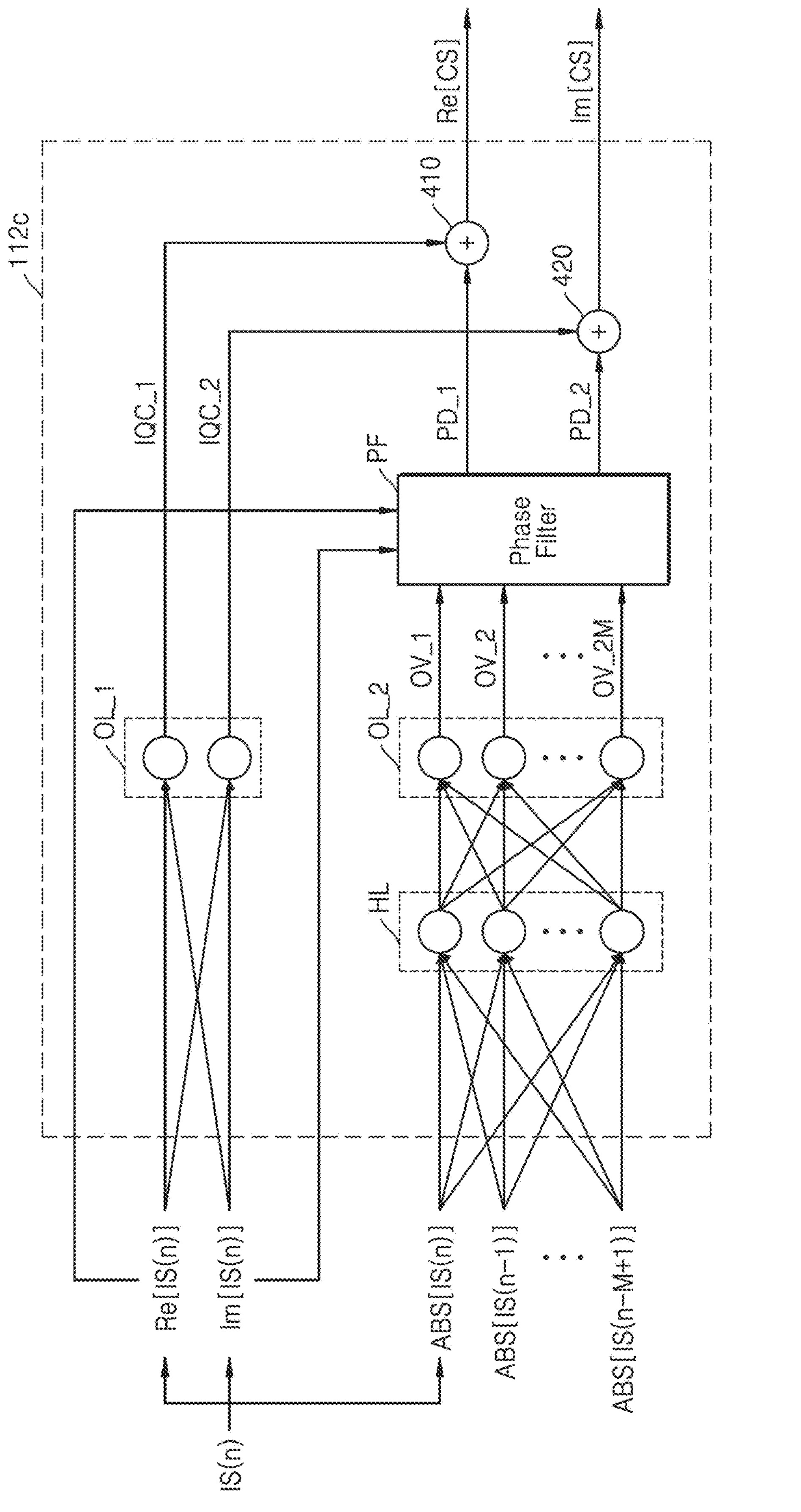
FIG. 6 is a block diagram illustrating a linearity calibration model according to embodiments.

Although not shown for convenience of expression, it may be understood with reference to FIG. 3 that arrows between input data (e.g., Re[IS(n)], Im[IS(n)], ABS[IS(n)], and the like) and nodes in FIG. 6 may indicate that weights are applied to the input data and an output of a node may indicate that a bias is applied to the input data. In addition, it may be understood that the linearity calibration model 112*c* may include an input layer and at least one hidden layer HL.

The linearity calibration model 112*c* may correspond to the linearity calibration model 112*a* of FIG. 4 and/or the linearity calibration model 112*b* of FIG. 5.

Referring to FIG. 6, the linearity calibration model 112*c* according to the inventive concepts may generate a calibration signal based on a current input signal IS(n). The current input signal IS(n) and the calibration signal may be complex signals. For example, a first calibration value Re[CS] may be the real part of the calibration signal, and a second calibration value Im[CS] may be the imaginary part of the calibration signal.

The linearity calibration model 112*c* may generate a first IQ compensation value IQC_1 and a second IQ compensation value IQC_2 based on the current input signal IS(n). Particularly, the linearity calibration model 112*c* may include the first output layer OL_1, and may generate the first IQ compensation value IQC_1 and the second IQ compensation value IQC_2 based on a real part Re[IS(n)] of the current input signal IS(n) and an imaginary part Im[IS(n)] of the current input signal IS(n) input through the first output layer OL_1. The first IQ compensation value IQC_1 and the second IQ compensation value IQC_2 may indicate values obtained by performing the aforementioned IQ mismatch compensation on the current input signal IS(n).

The linearity calibration model 112*c* may generate a first pre-distortion value PD_1 and a second pre-distortion value PD_2 based on the current input signal IS(n) and at least one previously generated input signal. Particularly, the linearity calibration model 112*c* may include at least one hidden layer HL and the second output layer OL_2, and may generate a plurality of output values OV_1 to OV_2M based on respective magnitudes ABS[IS(n)] to ABS[IS(n−M+1)] of a plurality of input signals input through the at least one hidden layer HL and the second output layer OL_2. The second output layer OL_2 may transmit the plurality of output values OV_1 to OV_2M to a phase filter PF. Although it is expressed that the number of output values OV_1 to OV_2M is twice the number of respective magnitudes ABS[IS(n)] to ABS[IS(n−M+1)] of the plurality of input signals, this is only illustrative, and the inventive concepts are not limited thereto. The respective magnitudes ABS[IS(n−1)] to ABS[IS(n−M+1)] of previously generated input signals may be received from the memory 140 (see FIG. 2). Herein, n may be used to indicate a current time point. Therefore, the current input signal IS(n) may indicate the most recently generated input signal. M is an integer greater than or equal to 2.

The nonlinearity of the power amplifier 121*a* (see FIG. 4) may be affected by the previously generated input signals. Therefore, the linearity calibration model 112*c* may effectively correct the nonlinearity due to the power amplifier 121*a* (see FIG. 4) by performing pre-distortion with the magnitudes of input signals generated before the current input signal IS(n).

The phase filter PF may generate the first pre-distortion value PD_1 and the second pre-distortion value PD_2 based on the plurality of output values OV_1 to OV_2M and a plurality of input signals IS(n) to IS(n−M+1). Previously generated input signals IS(n−1) to IS(n−M+1) received by the phase filter PF are omitted for convenience of description. The first pre-distortion value PD_1 and the second pre-distortion value PD_2 may indicate values obtained by performing pre-position on the current input signal IS(n).

A first adder 410 and a second adder 420 may generate the first calibration value Re[CS] and the second calibration value Im[CS] based on the first IQ compensation value IQC_1, the second IQ compensation value IQC_2, the first pre-distortion value PD_1, and the second pre-distortion value PD_2, respectively. Particularly, the first adder 410 may generate the first calibration value Re[CS] by adding the first IQ compensation value IQC_1 to the first pre-distortion value PD_1. The second adder 420 may generate the second calibration value Im[CS] by adding the second IQ compensation value IQC_2 to the second pre-distortion value PD_2.

As described above, the linearity calibration model 112*c* according to the inventive concepts may generate a calibration signal based on the first calibration value Re[CS] and the second calibration value Im[CS](e.g., by combining the first calibration value Re[CS] and the second calibration value Im[CS]), and the power amplifier 121*a* (see FIG. 4) may generate an output signal based on the calibration signal. The linearity calibration model 112*c* according to the inventive concepts may update parameters through a loss function based on the current input signal IS(n) and the output signal. The processor 110*a* (see FIG. 4) according to the inventive concepts may calculate the loss function as represented by Equation 1. However, the inventive concepts are not limited thereto.

$$\text{loss function} = MSE + \alpha_0 \times \frac{1}{ACLR} + \alpha_1 \times EVM \quad \text{[Equation 1]}$$

As described above, the scaling circuit 122*a* (see FIG. 4) may generate the scaled output signal SS (see FIG. 4) by down-scaling the output signal based on the reciprocal of the amplification coefficient.

In Equation 1, a mean squared error (MSE) indicates the mean square of the difference between an input signal and a scaled output signal. Herein, the band of the input signal may be the same as (or similar to) the band of the scaled output signal. The difference between the input signal and the scaled output signal may be calculated through the loss function, and the parameters of the linearity calibration model 112*c* may be updated such that the difference is minimized (or reduced). Herein, while minimizing (or reducing) the difference, the parameters may be updated such that the aforementioned CFR is performed. That is, a PAPR may be decreased by performing the CFR on an input signal through the linearity calibration model 112*c* that has been trained.

In Equation 1, an adjacent channel leakage ratio (ACLR) is an index indicating linearity and indicates adjacent channel power to channel power of the output signal. As described above, if intermodulation occurs due to the nonlinearity of a power amplifier, a non-intended frequency component (may be referred to as noise) may be generated in a channel adjacent to the channel of the output signal. The processor 110*a* (see FIG. 4) may calculate the ACLR based on the output signal.

In Equation 1, an EVM is an index indicating linearity and is obtained by measuring the difference between an ideally modulated value of the input signal and an actually modulated value of the input signal. Therefore, the EVM may be worse due to the aforementioned IQ mismatch and the nonlinearity of the power amplifier. The processor 110*a* (see FIG. 4) according to the inventive concepts may calculate the EVM based on the output signal and the input signal. The processor 110*a* (see FIG. 4) according to the inventive concepts may update the parameters of the linearity calibration model 112*a* based on the loss function such that the MSE, the EVM, and the ACLR are minimized (or reduced). The processor 110*a* (see FIG. 4) according to the inventive concepts may calculate the loss function based on the indexes described above and other indexes. For example, the processor 110*a* (see FIG. 4) may calculate the loss function by adding the sensitivity of a receiver.

In Equation 1, $\alpha_0$ and $\alpha_1$ are respective balancing factors for the ACLR and the EVM. The processor 110*a* (see FIG. 4) according to the inventive concepts may adjust the respective balancing factors for the ACLR and the EVM according to the characteristic and/or specification of a signal. The processor 110*a* (see FIG. 4) according to the inventive concepts may complementarily adjust the balancing factors to be respectively applied to the ACLR and the EVM. The complementarily adjusting of the balancing factors by the processor 110*a* (see FIG. 4) may indicate that a balancing factor to be applied to any one of the EVM and/or the ACLR is increased or decreased when a balancing factor to be applied to the other of the EVM and/or the ACLR is decreased or increased. For example, referring to Equation 1, if the EVM is sufficiently small in a situation in which the ACLR is further decreased to satisfy a particular specification, $\alpha_0$ may be increased and $\alpha_1$ may be decreased. According to embodiments, the processor 110*a* may update the parameters of the linearity calibration model by complementarily adjusting the balancing factors (e.g., based on the loss function in which the balancing factors have been adjusted). According to embodiments, the balancing factors may be omitted from Equation 1, or may both be set equal to '1'.

Figure 7:
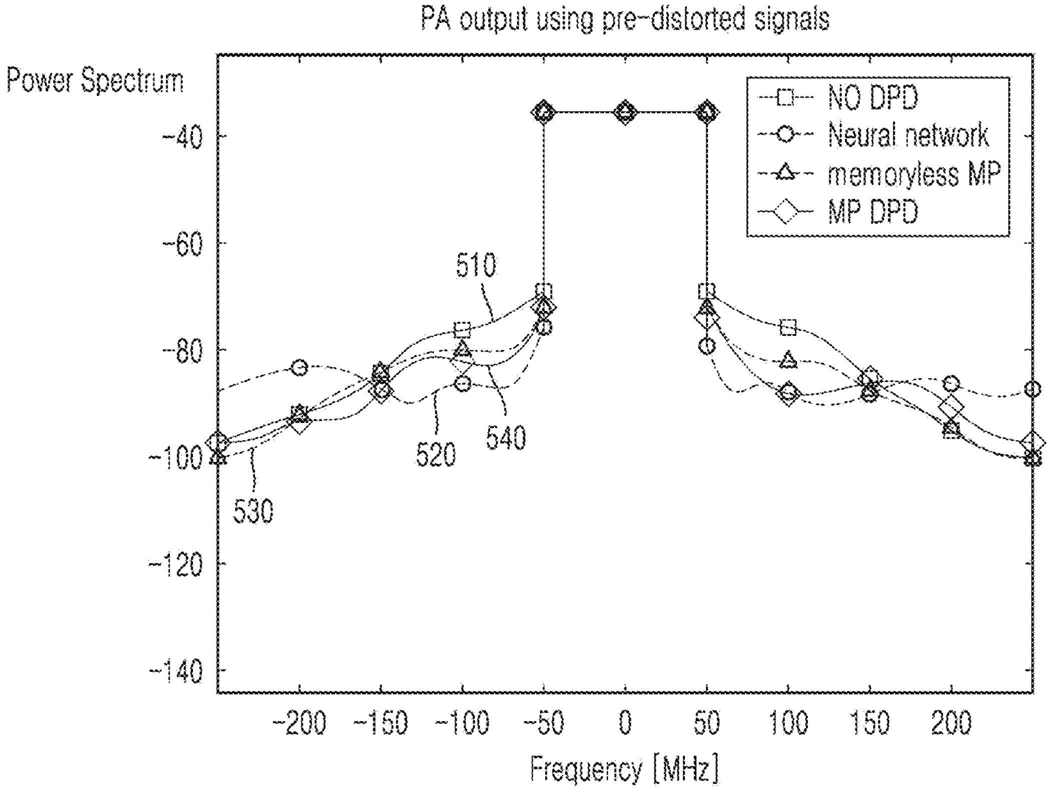
FIG. 7 is a graph in which the adjacent channel leakage ratio (ACLR) of an output signal generated by a wireless communication device according to embodiments is compared with the ACLRs of output signals according to comparative examples.

FIG. 7 is a graph in which the ACLR of an output signal generated by a wireless communication device according to embodiments is compared with the ACLRs of output signals according to comparative examples.

FIG. 7 is a graph in which the ACLR of an output signal generated through a neural network-based linearity calibration model according to the inventive concepts is compared with ACLRs of output signals according to comparative examples.

In FIG. 7, the horizontal axis indicates a frequency band and the vertical axis indicates a power spectrum. An ACLR may be less as a power spectrum is less in a frequency band (an ambient frequency band) other than a particular frequency band (may be referred to as a target frequency band). In particular, an ACLR may decrease as the power spectrum of an ambient frequency band relatively close to the target frequency band among ambient frequency bands decreases.

Referring to FIG. 7, among an ACLR 520 of an output signal generated through a neural network-based linearity calibration model according to the inventive concepts, an ACLR 510 of an output signal on which pre-position has not been performed, an ACLR 540 of an output signal on which pre-position has been performed through an MP model, and an ACLR 530 of an output signal on which pre-position has been performed through a memoryless polynomial model, the ACLR 520 of the output signal generated through the neural network-based linearity calibration model according to the inventive concepts is the least.

Figure 8:
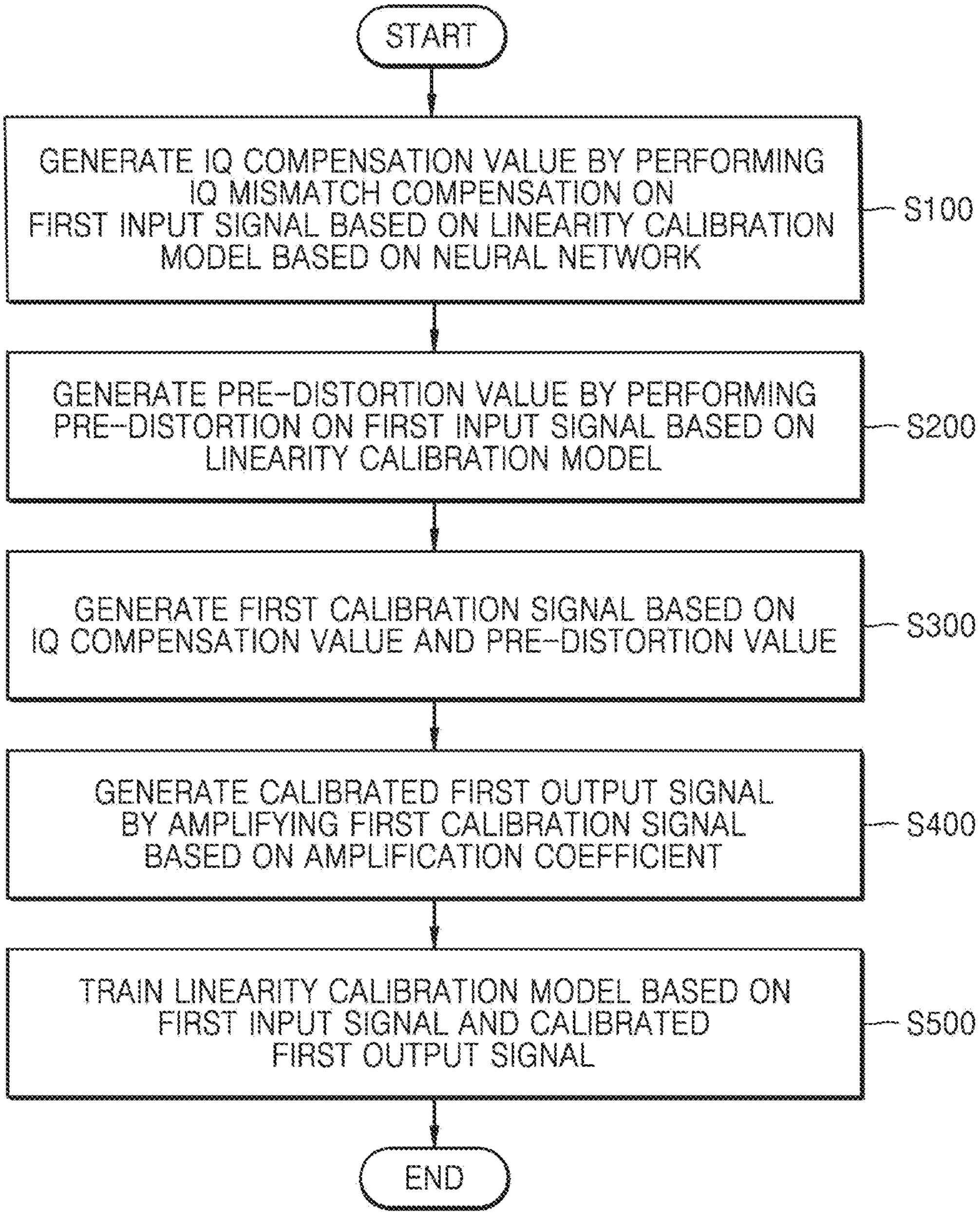
FIG. 8 is a flowchart for describing an operating method of a wireless communication device, according to embodiments.

FIG. 8 is a flowchart for describing an operating method of a wireless communication device, according to embodiments.

Referring to FIG. 8, in operation S100, the wireless communication device 100 (see FIG. 1) may generate an IQ compensation value by performing IQ mismatch compensation on a first input signal using a linearity calibration model based on a neural network. The IQ compensation value may include a first IQ compensation value corresponding to the real part of a calibration signal and a second IQ compensation value corresponding to the imaginary part of the calibration signal, the first and second IQ compensation values having been described with reference to FIG. 6.

In operation S200, the wireless communication device 100 (see FIG. 1) may generate a pre-distortion value by performing pre-distortion on the first input signal using the linearity calibration model. The pre-distortion value may include a first pre-distortion value corresponding to the real part of the calibration signal and a second pre-distortion value corresponding to the imaginary part of the calibration signal, the first and second pre-distortion values having been described with reference to FIG. 6.

In operation S300, the wireless communication device 100 (see FIG. 1) may generate a first calibration signal based on the IQ compensation value and the pre-distortion value. The wireless communication device 100 (see FIG. 1) may calculate the real part of the first calibration signal based on the sum of the first IQ compensation value and the first pre-distortion value, and calculate the imaginary part of the first calibration signal based on the sum of the second IQ compensation value and the second pre-distortion value. As described above, each of an input signal, a calibration signal, and an output signal may be a complex signal.

In operation S400, the wireless communication device 100 (see FIG. 1) may generate a first output signal by amplifying the first calibration signal based on an amplification coefficient.

In operation S500, the wireless communication device 100 (see FIG. 1) may train the linearity calibration model based on the first input signal and the first output signal. That is, the wireless communication device 100 (see FIG. 1) may update parameters of the linearity calibration model based on the first input signal and the first output signal.

The wireless communication device 100 (see FIG. 1) may perform the aforementioned IQ mismatch compensation and pre-distortion on an input signal based on the trained linearity calibration model. For example, as described above, the wireless communication device 100 (see FIG. 1) may update parameters for linearity calibration based on the first input signal and the first output signal, and generate a second calibration signal by performing, based on the trained linearity calibration model, IQ mismatch compensation and pre-distortion on a second input signal generated after the first input signal. A power amplifier may generate a second output signal by amplifying the second calibration signal. Because the second calibration signal is a signal pre-calibrated in correspondence to the nonlinearity of the power amplifier, the nonlinearity of the second output signal with respect to the second input signal may be corrected regardless of the nonlinearity of the power amplifier.

As described above, in operation S500, the wireless communication device 100 (see FIG. 1) may train the linearity calibration model such that the difference between an input signal and an output signal corresponding to the input signal is minimized (or reduced). That is, the parameters of the linearity calibration model may be updated. Furthermore, an EVM may be calculated (e.g., by the processor 110) based on the input signal and the output signal, and an ACLR may be calculated (e.g., by the processor 110) based on the output signal. The wireless communication device 100 (see FIG. 1) may train the linearity calibration model such that the EVM and the ACLR are minimized (or reduced), and also train the linearity calibration model according to the characteristics of a particular specification and/or signal by applying a balancing factor to each of the EVM and the ACLR (e.g., using the loss function discussed in connection with FIG. 6).

Figure 9:
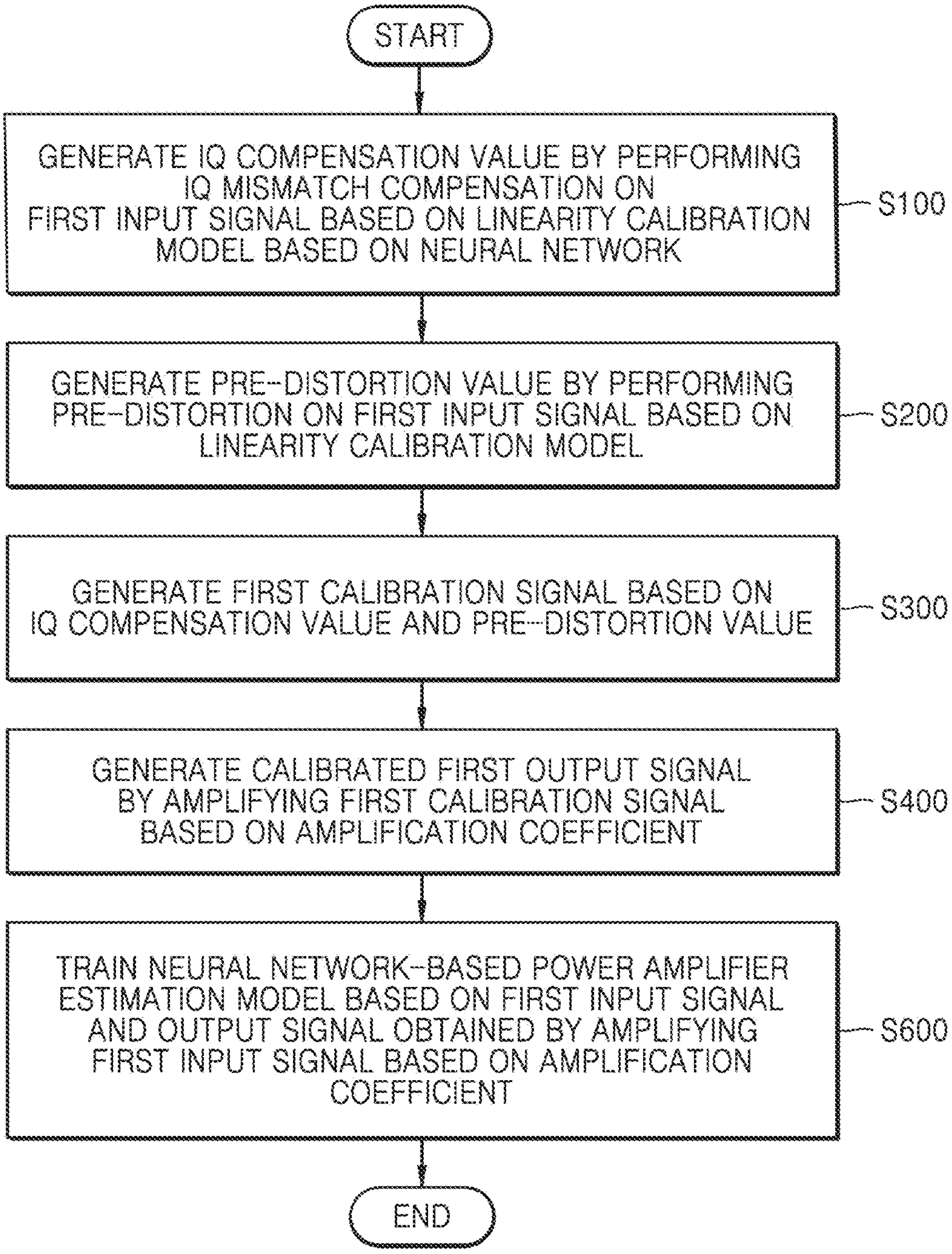
FIG. 9 is a flowchart for describing an operating method of a wireless communication device, according to embodiments.

FIG. 9 is a flowchart for describing an operating method of a wireless communication device, according to embodiments.

A description of operations S100, S200, S300, and S400 of FIG. 9 is the same as (or similar to) the description made above with reference to FIG. 8 and is thus omitted herein.

However, an operation to be described below may not be performed by performing operations S100, S200, S300, and S400. That is, operation S600 may be separately performed from operations S100, S200, S300, and S400.

Referring to FIG. 9, in operation S600, a power amplifier estimation model based on a neural network may be trained based on a first input signal and an output signal obtained by amplifying the first input signal based on an amplification coefficient. The trained power amplifier estimation model may operate similarly to or the same as a power amplifier. This is an example according to the inventive concepts, and the inventive concepts are not limited thereto. For example, the power amplifier estimation model may be trained based on the first input signal and a calibrated first output signal.

The wireless communication device 100 (see FIG. 1) according to the inventive concepts may generate a second calibration signal by performing, based on the linearity calibration model, the IQ mismatch compensation and pre-distortion, described with reference to FIG. 8, on a second input signal generated after the first input signal. The wireless communication device 100 (see FIG. 1) may generate a first estimated output signal by amplifying the second calibration signal based on the trained power amplifier estimation model. The wireless communication device 100 (see FIG. 1) may train the linearity calibration model based on the first estimated output signal and the second input signal.

The wireless communication device 100 (see FIG. 1) according to the inventive concepts may generate a third calibration signal by performing, based on the trained linearity calibration model, IQ mismatch compensation and pre-distortion on a third input signal generated after the second input signal, and generate a third output signal by amplifying the third calibration signal. Because the third calibration signal is a signal pre-calibrated in correspondence to the nonlinearity of the power amplifier, the nonlinearity of the third output signal with respect to the third input signal may be corrected regardless of the nonlinearity of the power amplifier.

The wireless communication device 100 (see FIG. 1) according to the inventive concepts may train the linearity calibration model such that the difference between the second input signal and the first estimated output signal is minimized (or reduced). As described above, the wireless communication device 100 (see FIG. 1) may update the parameters of the linearity calibration model such that an MSE for the second input signal and the first estimated output signal is minimized (or reduced). Furthermore, the wireless communication device 100 (see FIG. 1) may calculate an EVM based on the second input signal and the first estimated output signal and calculate an ACLR based on the first estimated output signal. The wireless communication device 100 (see FIG. 1) may train the linearity calibration model based on any one of the calculated EVM and/or ACLR. For example, the wireless communication device

100 (see FIG. 1) may update the parameters of the linearity calibration model such that the EVM and the ACLR are minimized (or reduced). In addition, the wireless communication device 100 (see FIG. 1) may apply a balancing factor to each of the EVM and the ACLR and train the linearity calibration model considering the characteristics of a signal and a required (or configured) specification by adjusting the balancing factor applied to each of the EVM and the ACLR.

In the description made above, each of "first", "second", and "third" is an expression used to identify signals and does not limit the number of particular signals in the inventive concepts.

Figure 10:
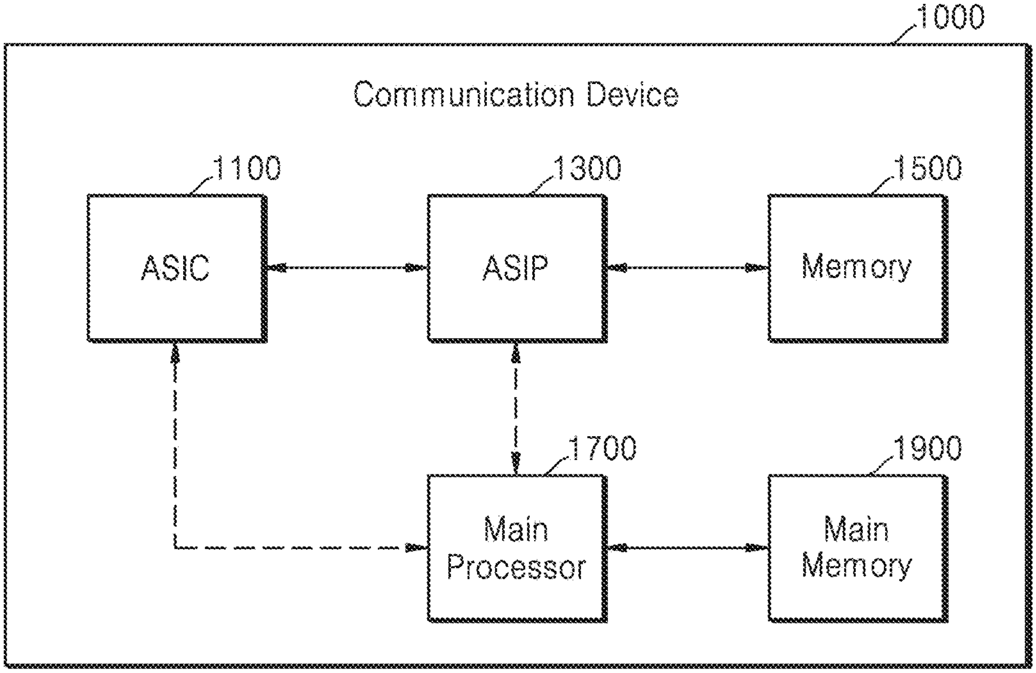
FIG. 10 is a block diagram illustrating a wireless communication device according to embodiments.

FIG. 10 is a block diagram illustrating a wireless communication device 1000 according to embodiments.

Referring to FIG. 10, the wireless communication device 1000 may include an ASIC 1100, an application specific instruction set processor (ASIP) 1300, a memory 1500, a main processor 1700, and/or a main memory 1900. Two or more of the ASIC 1100, the ASIP 1300, and the main processor 1700 may communicate with each other. In addition, two or more of the ASIC 1100, the ASIP 1300, the memory 1500, the main processor 1700, and the main memory 1900 may be embedded in one chip.

The ASIP 1300, as an integrated circuit customized for a particular usage, may support a dedicated instruction set for a particular application and execute instructions included in the instruction set. The memory 1500 may communicate with the ASIP 1300 and store, as a non-transitory storage device, a plurality of instructions to be executed by the ASIP 1300. For example, the memory 1500 may include, as a non-limiting example, a random type of memory, such as RAM, ROM, tape, a magnetic disk, an optical disc, a volatile memory, a nonvolatile memory, or a combination thereof, accessible by the ASIP 1300.

The main processor 1700 may control the wireless communication device 1000 by executing a plurality of instructions. For example, the main processor 1700 may control the ASIC 1100 and the ASIP 1300, and process received data or a user's input on the wireless communication device 1000. The main memory 1900 may communicate with the main processor 1700 and store, as a non-transitory storage device, a plurality of instructions to be executed by the main processor 1700. For example, the main memory 1900 may include, as a non-limiting example, a random type of memory, such as RAM, ROM, tape, a magnetic disk, an optical disc, a volatile memory, a nonvolatile memory, or a combination thereof, accessible by the main processor 1700.

A wireless communication device according to embodiments and an operating method of the wireless communication device, which have been described with reference to FIGS. 1 to 9, may be performed by at least one of the components included in the wireless communication device 1000 of FIG. 10. In embodiments, at least one operation of the aforementioned operating method of the wireless communication device 1000 may be implemented by a plurality of instructions stored in the memory 1500. In embodiments, at least one of the operations of the operating method may be performed by the ASIP 1300 executing the plurality of instructions stored in the memory 1500.

Wireless communication devices generate transmission signals by amplifying baseband signals using power amplifiers. However, power amplifiers have non-linear output characteristics relative to input signals such that the generated transmission signals have reduced signal strength and excessive noise. Conventional devices and methods for correcting for the nonlinearity of power amplifiers rely on imprecise heuristic approaches that are unable to sufficiently compensate for the nonlinearity. Accordingly, the conventional devices and methods experience excessive performance degradation including, for example, transmission signals having reduced signal strength and excessive noise.

However, according to embodiments, improved devices and methods are provided for correcting for the nonlinearity of power amplifiers. For example, the improved devices and methods may train a linearity calibration model to output a calibration signal based on an input signal such that the calibration signal, when amplified by a power amplifier, corresponds to the input signal that is amplified with the nonlinearity of the power amplifier corrected for. The linearity calibration model may be trained, for instance, to minimize (or reduce) a difference between the input signal and the amplified calibration signal. Accordingly, the improved devices and methods may overcome the deficiencies of the conventional devices and methods to at least reduce performance degradation caused by the nonlinearity of power amplifiers. In so doing, the improved devices and methods may increase the signal strength of, and reduce the noise contained in, a transmission signal generated by the improved devices and methods relative to transmission signals generated by the conventional devices and methods.

According to embodiments, operations described herein as being performed by the wireless communication system WCS, the cell 200, the wireless communication device 100, the processor 110, the transmitter 120, the wireless communication device 100*a*, the processor 110*a*, the transmitter 120*a*, the linearity calibration module 111*a*, the scaling circuit 122*a*, the wireless communication device 100*b*, the processor 110*b*, the transmitter 120*b*, the linearity calibration module 111*b*, the power amplifier estimation module 113*b*, the scaling circuit 122*b*, the phase filter PF, the first adder 410, the second adder 420, the wireless communication device 1000, the ASIC 1100, the ASIP 1300 and/or main processor 1700 may be performed by processing circuitry. Further to the description above, the term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In embodiments, the processing circuitry may perform some operations (e.g., the operations described herein as being performed by the linearity calibration model 112*a*, the linearity calibration model 112*b*, the power amplifier estimation model, the linearity calibration model 112*c*, the output layer OL_1, the hidden layer HL and/or the output layer OL_2) by artificial intelligence and/or machine learning. As an example, the processing circuitry may implement an artificial neural network (e.g., the linearity calibration model 112*a*, the linearity calibration model 112*b*, the power amplifier estimation model, and/or the linearity calibration model 112*c*) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Herein, the machine learning model may have any structure that is trainable, e.g., with training data. For example, the machine learning model may include an artificial neural network, a decision tree, a support vector machine, a Bayesian network, a genetic algorithm, and/or the like. The machine learning model will now be described by mainly referring to an artificial neural network, but embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 140, the memory 1500 and/or the main memory 1900). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. A wireless communication device comprising:

first processing circuitry configured to generate a calibration signal by performing linearity calibration on a first input signal using a linearity calibration model, the linearity calibration model being based on a first neural network; and a power amplifier configured to generate a calibrated output signal by amplifying the calibration signal based on an amplification coefficient, wherein the linearity calibration model comprises:

a first output layer configured to generate a first IQ compensation value and a second IQ compensation value by performing IQ mismatch compensation on the first input signal, the first IQ compensation value corresponding to a real part of the calibrated output signal, and the second IQ compensation value corresponding to an imaginary part of the calibrated output signal, and second processing circuitry configured to generate a first pre-distortion value and a second pre-distortion value by performing pre-distortion on the first input signal, the first pre-distortion value corresponding to the real part of the calibrated output signal, and the second pre-distortion value corresponding to the imaginary part of the calibrated output signal, and the first processing circuitry is configured to generate the calibration signal based on the first IQ compensation value, the second IQ compensation value, the first pre-distortion value and the second pre-distortion value.

2. The wireless communication device of claim 1, wherein the first processing circuitry is configured to update parameters of the linearity calibration model based on the first input signal and the calibrated output signal.

3. The wireless communication device of claim 2, wherein the first processing circuitry is configured to:

generate a scaled output signal by down-scaling the calibrated output signal based on a reciprocal of the amplification coefficient; and update the parameters of the linearity calibration model based on a difference between the scaled output signal and the first input signal.

4. The wireless communication device of claim 3, wherein the first processing circuitry is configured to:

calculate an error vector magnitude (EVM) based on the first input signal and the calibrated output signal;

calculate an adjacent channel leakage ratio (ACLR) based on the calibrated output signal; and update the parameters of the linearity calibration model based on at least one of the EVM or the ACLR.

5. The wireless communication device of claim 4, wherein the first processing circuitry is configured to:

apply a first balancing factor to the EVM and a second balancing factor to the ACLR; and update the parameters of the linearity calibration model by complementarily adjusting the first balancing factor and the second balancing factor.

6. The wireless communication device of claim 1, further comprising:

a power amplifier estimation model based on a second neural network, wherein the first processing circuitry is configured to update parameters of the power amplifier estimation model based on the first input signal and a first output signal, the first output signal being obtained by amplifying the first input signal based on the amplification coefficient.

7. The wireless communication device of claim 6, wherein the power amplifier estimation model is configured to generate an estimated output signal based on the calibration signal; and the first processing circuitry is configured to update parameters of the linearity calibration model based on the first input signal and the estimated output signal.

8. The wireless communication device of claim 6, wherein the first processing circuitry is configured to:

calculate an error vector magnitude (EVM) based on the first input signal and an estimated output signal;

calculate an adjacent channel leakage ratio (ACLR) based on the estimated output signal; and update parameters of the linearity calibration model based on at least one of the EVM or the ACLR.

9. The wireless communication device of claim 1, wherein a real part of the calibration signal is a sum of the first IQ compensation value and the first pre-distortion value; and an imaginary part of the calibration signal is a sum of the second IQ compensation value and the second pre-distortion value.

10. The wireless communication device of claim 1, wherein the linearity calibration model further comprises a second output layer configured to output at least two output values, the at least two output values being generated based on an amplitude of the first input signal and an amplitude of each of at least one second input signal, and the at least one second input signal being generated before the first input signal; and the second processing circuitry being configured to generate the first pre-distortion value and the second pre-distortion value based on the first input signal and the at least two output values.

11. An operating method of a wireless communication device, the method comprising:

generating an IQ compensation value by performing IQ mismatch compensation on a first input signal using a linearity calibration model, the linearity calibration model being based on a neural network;

generating a pre-distortion value by performing pre-distortion on the first input signal using the linearity calibration model;

generating a first calibration signal based on the IQ compensation value and the pre-distortion value;

generating a calibrated first output signal by amplifying the first calibration signal based on an amplification coefficient; and training the linearity calibration model based on the first input signal and the calibrated first output signal.

12. The method of claim 11, wherein the IQ compensation value comprises a first IQ compensation value and a second IQ compensation value, the first IQ compensation value corresponding to a real part of the calibrated first output signal, and the second IQ compensation value corresponding to an imaginary part of the calibrated first output signal;

the pre-distortion value comprises a first pre-distortion value and a second pre-distortion value, the first pre-distortion value corresponding to the real part of the calibrated first output signal, and the second pre-distortion value corresponding to the imaginary part of the calibrated first output signal; and the generating of the first calibration signal comprises generating the first calibration signal based on a sum of the first IQ compensation value and the first pre-distortion value, and a sum of the second IQ compensation value and the second pre-distortion value.

13. The method of claim 11, further comprising:

performing IQ mismatch compensation and pre-distortion on a second input signal after the training of the linearity calibration model, the second input signal being generated after the first input signal.

14. The method of claim 11, wherein the training of the linearity calibration model comprises:

training the linearity calibration model such that a difference between the first input signal and the calibrated first output signal is minimized; and training the linearity calibration model further based on at least one of an error vector magnitude (EVM) or an adjacent channel leakage ratio (ACLR), the EVM being calculated based on the first input signal and the calibrated first output signal, and the ACLR being calculated based on the calibrated first output signal.

15. The method of claim 14, wherein the training of the linearity calibration model comprises:

applying a first balancing factor to the EVM and a second balancing factor to the ACLR; and training the linearity calibration model by complementarily adjusting the first balancing factor and the second balancing factor.

16. An operating method of a wireless communication device, the method comprising:

generating an IQ compensation value by performing IQ mismatch compensation on a first input signal using a linearity calibration model, the linearity calibration model being based on a first neural network;

generating a pre-distortion value by performing pre-distortion on the first input signal using the linearity calibration model;

generating a first calibration signal based on the IQ compensation value and the pre-distortion value;

generating a calibrated first output signal by amplifying the first calibration signal based on an amplification coefficient; and training a power amplifier estimation model based on the first input signal and a first output signal to obtain a trained power amplifier estimation model, the power amplifier estimation model being based on a second neural network, and the first output signal being obtained by amplifying the first input signal based on the amplification coefficient.

17. The method of claim 16, further comprising:

generating a second calibration signal by performing IQ mismatch compensation and pre-distortion on a second input signal using the linearity calibration model, the second input signal being generated after the first input signal; and generating a first estimated output signal by amplifying the second calibration signal using the trained power amplifier estimation model.

18. The method of claim 17, further comprising:

training the linearity calibration model based on the first estimated output signal and the second input signal.

19. The method of claim 18, further comprising:

generating a third calibration signal by performing IQ mismatch compensation and pre-distortion on a third input signal using the linearity calibration model after the training of the linearity calibration model, the third input signal being generated after the second input signal; and generating a third output signal by amplifying the third calibration signal based on the amplification coefficient.

20. The method of claim 18, wherein the training of the linearity calibration model comprises:

training the linearity calibration model such that a difference between the second input signal and the first estimated output signal is minimized; and training the linearity calibration model further based on at least one of an error vector magnitude (EVM) or an adjacent channel leakage ratio (ACLR), the EVM being calculated based on the second input signal and the first estimated output signal, and the ACLR being calculated based on the first estimated output signal.

* * * * *